United States Patent
Huang

(10) Patent No.: US 12,463,862 B2
(45) Date of Patent: Nov. 4, 2025

(54) CONFIGURATION METHOD AND CONFIGURATION UNIT THEREOF

(71) Applicant: Wistron Corporation, New Taipei (TW)

(72) Inventor: Yuan-Fu Huang, New Taipei (TW)

(73) Assignee: Wistron Corporation, New Taipei (TW)

( * ) Notice: Subject to any disclaimer, the term of this patent is extended or adjusted under 35 U.S.C. 154(b) by 133 days.

(21) Appl. No.: 18/230,152

(22) Filed: Aug. 3, 2023

(65) Prior Publication Data

US 2024/0372776 A1    Nov. 7, 2024

(30) Foreign Application Priority Data

May 5, 2023    (TW) .................................. 112116714

(51) Int. Cl.
*H04L 41/0803* (2022.01)
*H04L 41/122* (2022.01)

(52) U.S. Cl.
CPC ........ *H04L 41/0803* (2013.01); *H04L 41/122* (2022.05)

(58) Field of Classification Search
CPC ........................... H04L 41/0803; H04L 41/122
See application file for complete search history.

(56) References Cited

U.S. PATENT DOCUMENTS

| | | | | |
|---|---|---|---|---|
| 10,594,792 | B1* | 3/2020 | Danilov | G06F 3/0607 |
| 2014/0047084 | A1* | 2/2014 | Breternitz | G06F 9/5083 |
| | | | | 709/221 |
| 2020/0045116 | A1* | 2/2020 | Deodhar | H04L 41/5051 |
| 2020/0067773 | A1* | 2/2020 | Abes | H04L 67/10 |
| 2020/0293445 | A1* | 9/2020 | Ibrahim | G06F 12/0811 |
| 2021/0109672 | A1* | 4/2021 | Nagata | G06F 3/0683 |
| 2021/0216463 | A1* | 7/2021 | Chaudhari | G06F 12/0873 |
| 2024/0129161 | A1* | 4/2024 | Miriyala | H04L 41/122 |

FOREIGN PATENT DOCUMENTS

CN        113242296 A    8/2021

* cited by examiner

*Primary Examiner* — Minh Chau Nguyen
(74) *Attorney, Agent, or Firm* — Winston Hsu

(57) ABSTRACT

A configuration method and a configuration unit are provided. The configuration method is for a configuration unit coupled to a cluster. The configuration method includes calculating a first node number at a first time instant, and selecting at least one first node corresponding to the first node number from at least one node of the cluster. The at least one first node is configured to run a plurality of network functions of a core network respectively. The coverage or processing capacity of the network of the cluster can be expanded or reduced by increasing or decreasing the total node number of the at least one node in the cluster. The dependence on data centers or telecommunication rooms can be reduced.

20 Claims, 6 Drawing Sheets

CONFIGURATION METHOD AND CONFIGURATION UNIT THEREOF

BACKGROUND OF THE INVENTION

1. Field of the Invention

The present invention relates to a configuration method and a configuration unit thereof, and more particularly, to a configuration method and a configuration unit thereof that can expand or reduce the coverage or processing capacity of a network by increasing or decreasing the total number of nodes in a cluster.

2. Description of the Prior Art

To meet the needs and demands of users, mobile communication service providers continuously improve and expand available services as well as networks used to deliver such services. Network Functions Virtualization (NFV) is a concept of virtualizing traditional network services operated on networking equipment. Since NFV virtualizes network functions and eliminate specialized hardware, it allows for the addition or modification of network functions at the server level in a simplified provisioning process. Kubernetes is an orchestration system that facilitates the automated scaling, management, and deployment of applications and plays a role in NVF architecture. However, there are various challenges in leveraging the benefits offered by Kubernetes (e.g., better scalability and transferability) to deploy network functions.

Furthermore, there is still room for improvement in how to dynamically expand or reduce the coverage or processing capacity of a network and even reduce dependency on data centers or telecommunications/equipment rooms.

SUMMARY OF THE INVENTION

It is therefore an objective of the present invention to provide a configuration method and a configuration unit thereof to expand or reduce the coverage or processing capacity of a network by increasing or decreasing the total number of nodes in a cluster.

An embodiment of the present invention discloses a configuration method, for a configuration unit coupled to a cluster, comprising by the configuration unit, calculating a first node number at a first time instant; and selecting at least one first node corresponding to the first node number from at least one node of the cluster, wherein the at least one first node is configured to run a plurality of network functions of a core network respectively.

Another embodiment of the present invention discloses a configuration unit, coupled to a cluster, comprising a processing circuit, configured to execute a program code; and a storage circuit, coupled to the processing circuit and configured to store the program code, wherein the program code instructs the processing circuit to perform steps of calculating a first node number at a first time instant; and selecting at least one first node corresponding to the first node number from at least one node of the cluster, wherein the at least one first node is configured to run a plurality of network functions of a core network respectively.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
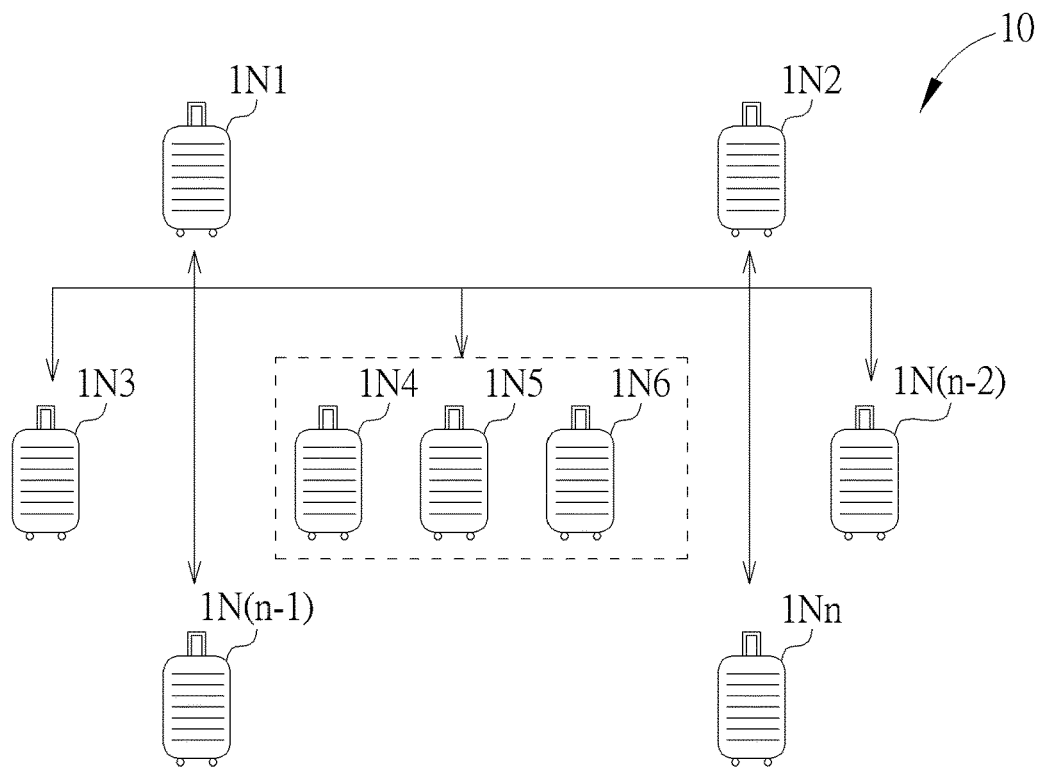
FIG. 1 is a schematic diagram of a cluster according to an embodiment of the present invention.

FIG. 1 is a schematic diagram of a cluster 10 according to an embodiment of the present invention. The cluster 10 may include a plurality of nodes (e.g., 1N1 to 1Nn), where n is a positive integer.

The nodes 1N1-1Nn may include network functions respectively. Network functions may be divided into (and construct) radio access network(s) (RAN) and core network(s) (CN). Network function(s) may be constructed using virtualization (e.g., software-hardware decoupling) and developed/deployed in a containerized manner. In an embodiment, the node 1N1 may include network function(s) of an RAN (e.g., including a distributed unit (DU) or a central unit (CU)), and the network function(s) may run/operate as containerized microservice(s) within the node 1N1. In an embodiment, the node 1N5 may include network functions of an RAN and a CN (e.g., including a DU or a CU of an RAN and including at least one of an access and mobility management function (AMF), a session management function (SMF), a network repository function (NRF), a user plane function (UPF), a policy charging function (PCF), an authentication server function (AUSF), a network slice selection function (NSSF), a network exposure function (NEF), a unified data management (UDF), an application function (AF), and other network components/elements of a CN), and the network functions may run/operate as containerized microservice(s) within the node 1N5.

In an embodiment, a node (e.g., 1N1) may be a computing device and may be configured within a suitcase/luggage (meaning that the node is at least easy to move, modular, or compact). The computing device may be implemented using different combinations of software, firmware, and/or hardware (e.g., circuit(s), hardware accelerator(s), processor(s), memory/memories, storage unit(s), or network card(s)); for example, the computing device may include x86 architecture processor(s), network accelerator chip(s), or encryption/decryption accelerator chip(s).

In an embodiment, a node (e.g., 1N1), which may be disposed in a suitcase/luggage, may deploy a network (e.g., a 5th generation (5G) mobile network network) in an application environment for, for example, virtual reality (VR) gaming. In an embodiment, with software defined networking (SDN) and network functions virtualization infrastructure (NFVI), nodes, which may be disposed in suitcases/luggage, may be connected/interconnected/bonded via the network to form the cluster 10, and network functions may be configured appropriately according to its application environment so as to deploy the network in the application environment of wider range such as an enterprise network, a campus network, a construction site, a factory network, or a wilderness area.

Moreover, the coverage or processing capacity of a network may be expanded or reduced by increasing or decreasing the total number of nodes (referred to as the total node number) in the cluster 10 so as to achieve/realize the effect of a plug-and-expand network or a unplug-and-shrink network (for dynamically expanding or shrinking the size of the network by adding or removing node(s)). In addition, with the functional architecture of the present invention, the dependence on data center(s) or telecommunications/equipment room(s) can be reduced.

Figure 2:
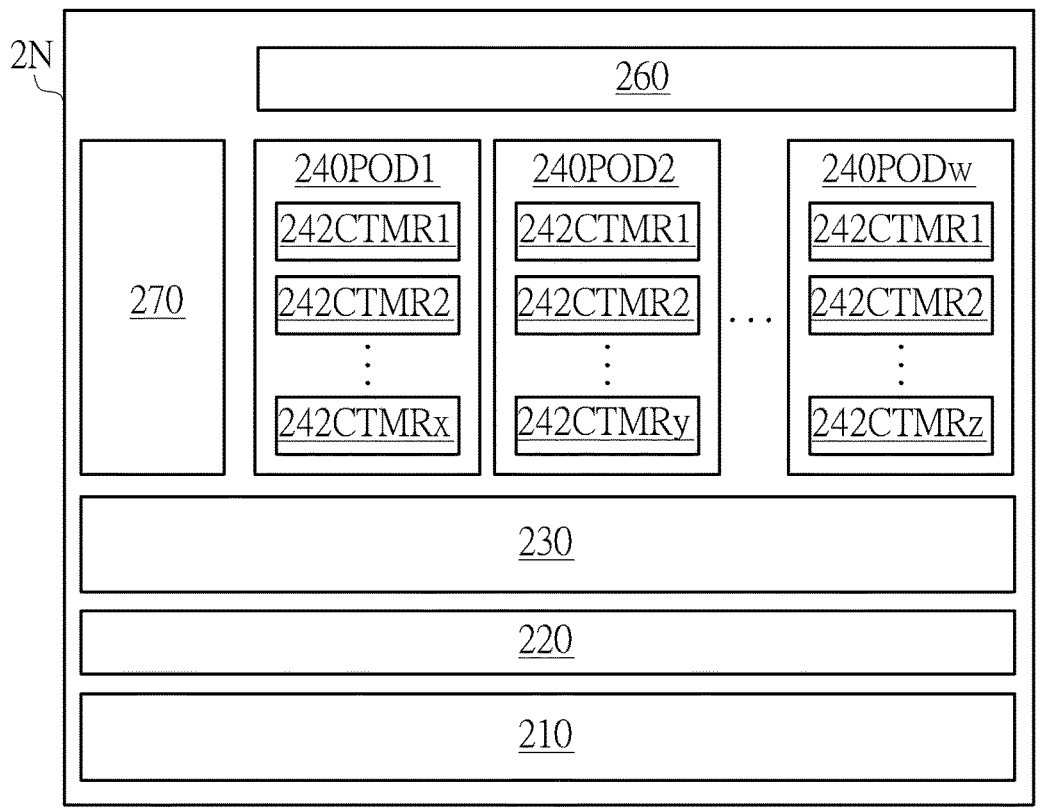
FIG. 2 is a schematic diagram of a node according to an embodiment of the present invention.

FIG. 2 is a schematic diagram of a node 2N according to an embodiment of the present invention. The node 2N, which may be used to implement the node 1N1, . . . or 1Nn, may include a hardware infrastructure 210, an operating system 220, a container orchestration platform 230, pods 240POD1-240PODw, a proxy 260, and a node agent 270, where w is a positive integer.

A pod (e.g., 240POD1) may include a plurality of containers (e.g., 242CTNR1-242CTNRx), and the containers of a pod (i.e., the containers organized into a pod) may share an Internet Protocol address (IP address) and/or other shared resources. A container (e.g., 242CTNR1) may include an instance of a microservice associated with a network function. For example, a container (e.g., 242CTNR1) may be used to run a registration microservice, a subscription microservice, or a discovery microservice of an NRF.

The container orchestration platform 230 may automate deployment, scaling, or load balancing of containers (e.g., 242CTNR1, . . . 242CTNRx, 242CTNR1, . . . 242CTNRy, 242CTNR1, . . . or 242CTNRz, where x, y, and z are positive integers). The container orchestration platform 230 may deploy pod(s) at the node 2N (and other nodes), and may manage deployed instances across different nodes. In an embodiment, the container orchestration platform 230 may be implemented using Kubernetes (k8s), Docker, or other orchestration platforms.

In an embodiment, the proxy 260 may be, for example, Kube-proxy; the node agent 270 may be, for example, Kubelets.

Figure 3:
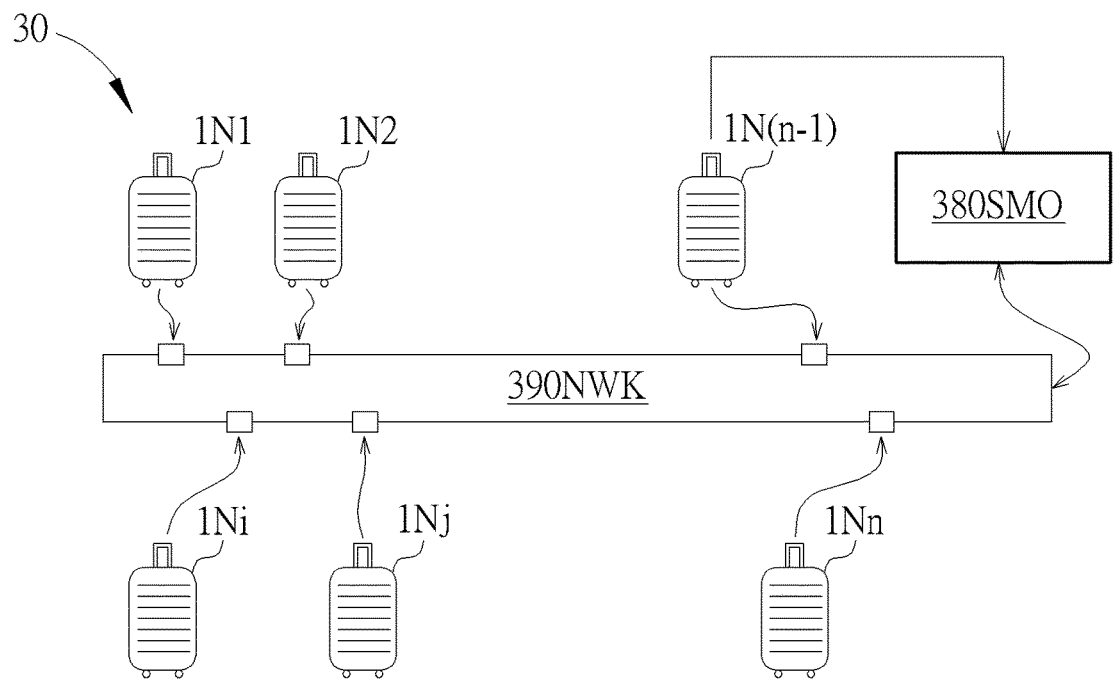
FIG. 3 is a schematic diagram of a communication system according to an embodiment of the present invention.

FIG. 3 is a schematic diagram of a communication system 30 according to an embodiment of the present invention. The communication system 30 may include a plurality of nodes (e.g., 1N1-1Nn) and a configuration unit 380SMO.

The configuration unit 380SMO may be configured to add/remove nodes (e.g., 1N1) to/from the cluster 10 and correspondingly compute/determine the deployment of a CN (e.g., selecting certain node(s) to perform dynamic CN function configuration (e.g., a configuration method 60, step S406, or S504)). The configuration unit 380SMO may be used as a registration center for node(s). Moreover, the configuration unit 380SMO may be configured to execute/implement a vertical pod autoscaler (VPA) mechanism to realize dynamic RAN function configuration (e.g., a configuration method 90).

In an embodiment, the configuration unit 380smo may be a smart service management and orchestration (SMO) of an open radio access network (O-RAN) system architecture. The configuration unit 380SMO may include an A1 controller, an O1 controller, a virtual event streaming (VES) controller, or a non-near-real-time RAN intelligent controller (RIC).

A network 390NWK connected to nodes (e.g., 1N1-1Nn) (and the nodes) may be in the same domain. A cluster (e.g., 10) formed by its nodes (e.g., 1N1-1Nn) may be a 5G network cluster.

Figure 4:
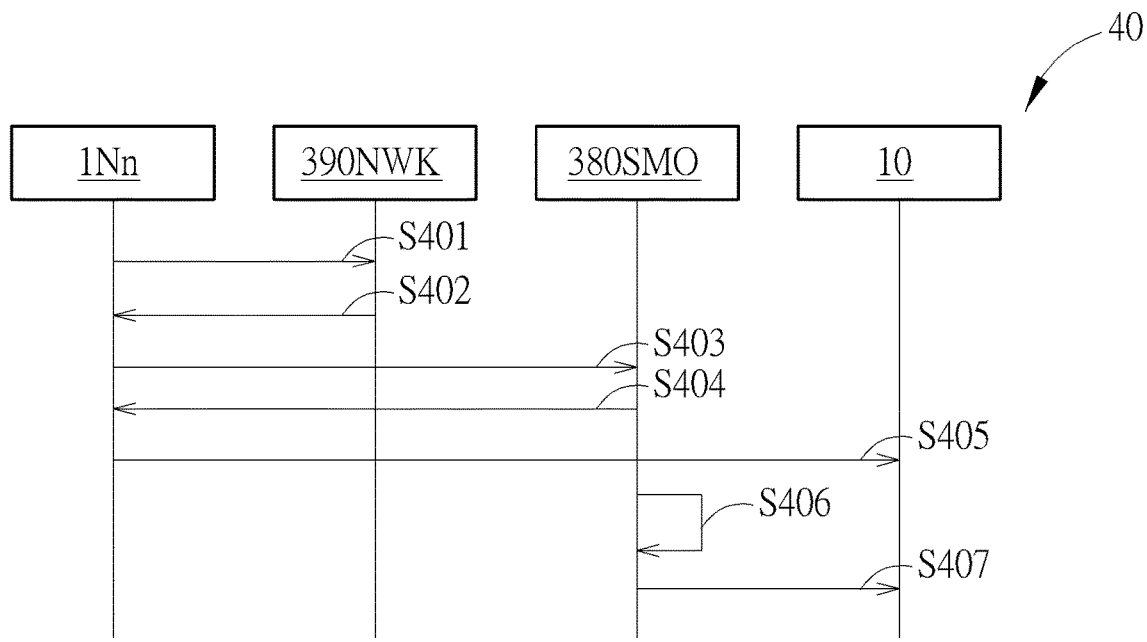
FIG. 4 and FIG. 5 are sequence diagrams of configuration methods according to embodiments of the present invention.

FIG. 4 is a sequence diagram of a configuration method 40 according to an embodiment of the present invention. The configuration method 40 may include the following steps:

Step S401: A node (e.g., a second node or the node 1Nn) may access the network 390NWK of the cluster 10.

Step S402: An IP address may be allocated to the (second) node, and the (second) node may receive information about a domain name or an IP address of the configuration unit 380SMO.

Step S403: The (second) node registers to the configuration unit 380SMO.

Step S404: The configuration unit 380SMO responds to the (second) node with registration information of the cluster 10.

Step S405: The (second) node is added to the cluster 10.

Step S406: The configuration unit 380SMO performs the dynamic CN function configuration.

Step S407: Network function(s) (of CN(s)) is/are deployed at or migrated to certain (selected) node(s) (e.g., a first node, $N_k$ first nodes, or the node 1N5, where $N_k$ is a positive integer) respectively (if necessary).

In more detail than previously explained, the cluster 10 initially may include the nodes 1N1-1N(n-1). After the node 1Nn is (powered on, plugin, or) connected to the network 390NWK of the cluster 10 in step S401, the node 1Nn may request an IP address from (dynamic host configuration protocol (DHCP) function of) the network 390NWK. After obtaining the information about the domain name or the IP address of the configuration unit 380SMO in step S402 (to, for example, tell where the configuration unit 380SMO is), the node 1Nn may notify the configuration unit 380SMO to perform registration in step S403. The configuration unit 380SMO may return the registration information of how to join the cluster 10 in step S404; alternatively, the configuration unit 380SMO may enable the node 1Nn to add into or directly add the node 1Nn into the cluster 10. In step S405, the node 1Nn may be added to the cluster 10 via an application programming interface (API) of Kubernetes, such that the cluster 10 includes the nodes 1N1-1Nn. After the node 1Nn joins the cluster 10, the topology of network function(s) may be rearranged/reconfigured in step S406 (e.g., by deciding/determining which node(s) run(s) network function(s) of a CN and which node(s) run(s) network function(s) of a RAN, defining the (node) number of node(s) (referred to as the node number) for CN allocation, or selecting node(s) for CN allocation). The configuration unit 380SMO may deploy network function(s) on appropriate node(s) in step S407 (e.g., according to the degree of correlation between the network function(s) or compute resources).

In an embodiment, the registration information may include, for example, a token or a certificate key, but is not limited thereto. In an embodiment, the registration information may include, for example:

```
kubeadm join 192.168.10.250:6443 --token 3662x5.gh5g3mfrf0pl8tgh
--discovery-token-ca-cet-hash
sha256:h48fc531bd1ab8ff2263e506c8484bcffe9ga78426535b2719ed3b45203ce83d
```

In an embodiment, step S405 may include, for example, the following execution process:

```
[preflight] Reading configuration from the cluster...
[preflight] FYI: You can look at this config file with 'kubectl -n kube-system get cm kubeadm-config -o yaml'
[kubelet-start] Writing kubelet configuration to file "/var/lib/kubelet/config.yaml"
[kubelet-start] Writing kubelet environment file with flags to file
"/var/lib/kubelet/kubeadm-flags.env"
[kubelet-start] Starting the kubelet
[kubelet-start] Waiting for the kubelet to perform the TLS Bootstrap...
This node has joined the cluster:
* Certificate signing request was sent to apiserver and a response was received.
* The Kubelet was informed of the new secure connection details.
```

Figure 5:
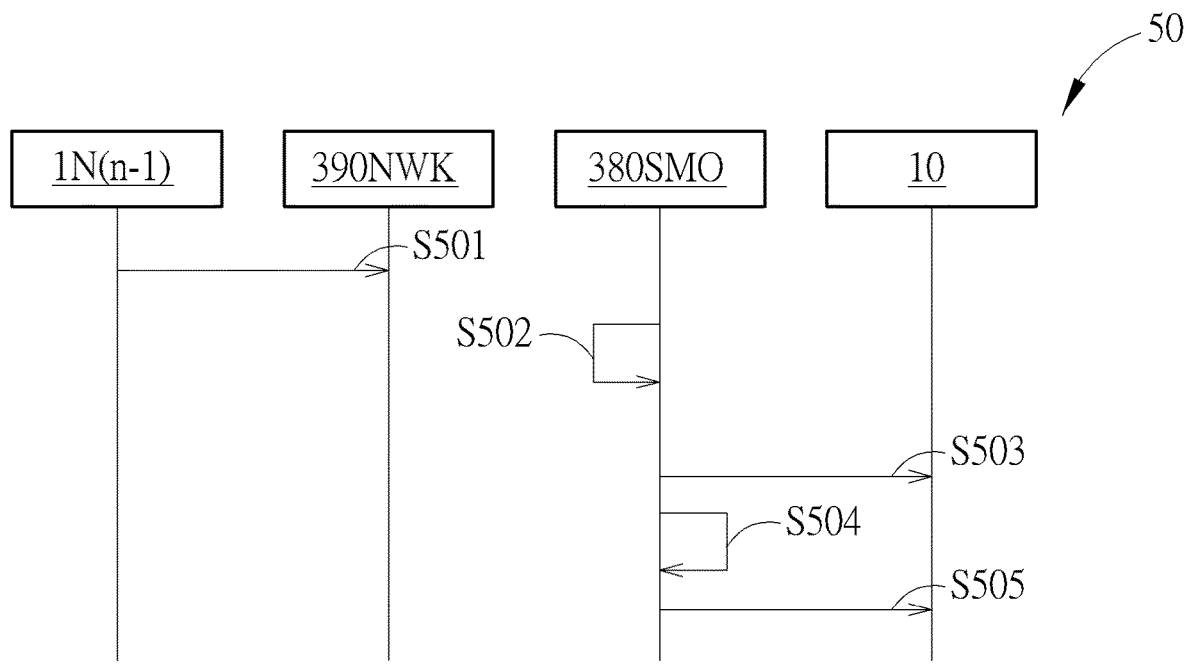

FIG. 5 is a sequence diagram of a configuration method 50 according to an embodiment of the present invention. The configuration method 50 may include the following steps:

Step S501: A node (e.g., a third node or the node 1N(n−1)) is no longer connected to the network 390NWK of the cluster 10.

Step S502: The configuration unit 380SMO cannot detect the (third) node and deregisters the (third) node.

Step S503: The (third) node is removed from the cluster 10.

Step S504: The configuration unit 380SMO performs the dynamic CN function configuration.

Step S505: Network function(s) (of CN(s)) is/are deployed at or migrated to certain (selected) node(s) (e.g., the first node, the $N_k$ first nodes, or the node 1N5) respectively (if necessary).

In more detail than previously explained, the cluster 10 initially may include the nodes 1N1-1Nn. In step S501, the node 1N(n−1) may be powered off, unplugged-in (i.e., removing the plug), disconnected to the network 390NWK, or moved out of the detectable range of the network 390NWK, and thus may be removed from the network 390NWK of the cluster 10. The configuration unit 380SMO may use a network "ping" method, the address resolution protocol (ARP), the Internet control message protocol (ICMP), or other network protocols to detect certain node (e.g., 1N(n−1)) or to test whether the certain node is connected to the network 390NWK after the certain node is plugged/connected/disconnected to/from the network 390NWK. The configuration unit 380SMO may cancel the registration of the node 1N(n−1) when (the heartbeat of) the node 1N(n−1) cannot be detected in step S502. In step S503, the configuration unit 380SMO may remove the node 1N(n−1) from the cluster 10, such that the cluster 10 includes the nodes 1N1-1N(n−2), and 1Nn. After the node 1N(n−1) is removed from the cluster 10, the topology of network function(s) may be rearranged/reconfigured in step S504 (e.g., by deciding/determining which node(s) run(s) network function(s) of CN(s) and which node(s) run(s) network function(s) of RAN(s), defining the node number for CN allocation/configuration, or selecting node(s) for CN allocation/configuration). The configuration unit 380SMO may deploy network function(s) on appropriate node(s) in step S505 (e.g., according to the degree of correlation between the network function(s) or compute resources).

As set forth above, when node(s) is/are added or removed, the cluster 10 may be automatically re-formed/reconfigured. After the cluster 10 is formed/re-formed, the node number of a CN may be recalculated, and certain node(s), which is/are more suitable, may be selected for configuring/deploying network function(s) of the CN (steps S406, S504). In other words, the configuration unit 380SMO may automatically deploy network components/elements (e.g., network function(s) of RAN(s) or CN(s)) according to network/application environment. In this way, the coverage or processing capacity of the network may be expanded or reduced by increasing or decreasing the total node number of the cluster 10 so as to achieve/realize the effect of expanding-network-after-plugin and shrinking-network-after-unplug.

Since one CN is usually corresponding/connected to a plurality of RANs in a 5G network, the present invention, for a cluster (e.g., 10) formed by a plurality of nodes, may decide/select which node(s) is/are for deploying network function(s) of the CN and which node(s) is/are for running network function(s) of the RANs. In an embodiment, the selection of suitable node(s) for deploying the CN may be dependent on network conditions, such that the deployment of the CN may vary over time, the node number, and/or the distribution of the nodes, thereby achieving dynamic CN function configuration.

Figure 6:
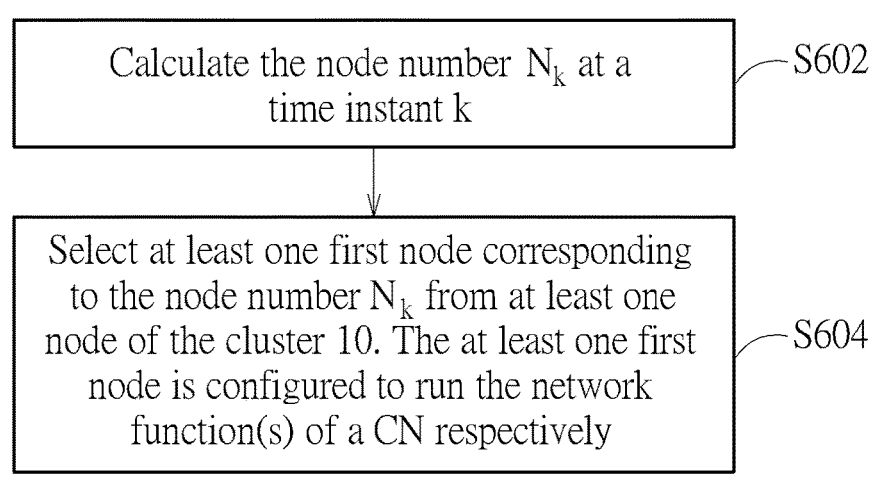
FIG. 6 is a flowchart of a configuration method according to an embodiment of the present invention.

For example, FIG. 6 is a flowchart of a configuration method 60 according to an embodiment of the present invention. The configuration method 60 may include the following steps:

Step S602: Calculate the node number $N_k$ (referred to as the first node number) at a time instant k, wherein the node number $N_k$ is the number of node(s) (e.g., the node(s) configured to run network function(s) of a CN).

Step S604: Select at least one first node (e.g., 1N5) corresponding to the node number $N_k$ from at least one node (e.g., 1N1-1Nn) of the cluster 10. The at least one first node (e.g., $N_k$ first nodes) is configured to run the network function(s) of the CN respectively.

In more detail than previously explained, in step S602 (e.g., corresponding to step S406 or S504), the configuration unit 380SMO may use an algorithm to predict/infer the node number $N_k$ for deploying the node(s) of the CN at the time instant k (referred to as the first time instant) in a prediction/inference stage. The algorithm may be an artificial intelligence (AI) model such as a convolutional neural network (CNN), a recurrent neural network (RNN), a long short-term memory (LSTM), a gated recurrent unit (GRU), or a combination thereof. The algorithm may involve supervised learning, unsupervised learning, semi-supervised learning, or reinforcement learning.

In an embodiment, the prediction of the node number $N_k$ may be related to the total node number of the nodes (e.g., 1N1-1Nn) of the cluster 10 and network conditions (e.g., the total throughput or the total node number for protocol data unit (PDU) sessions). In an embodiment, input feature data at L time instants may be used to predict output data at the time instant k (i.e., the node number $N_k$).

Figure 7:
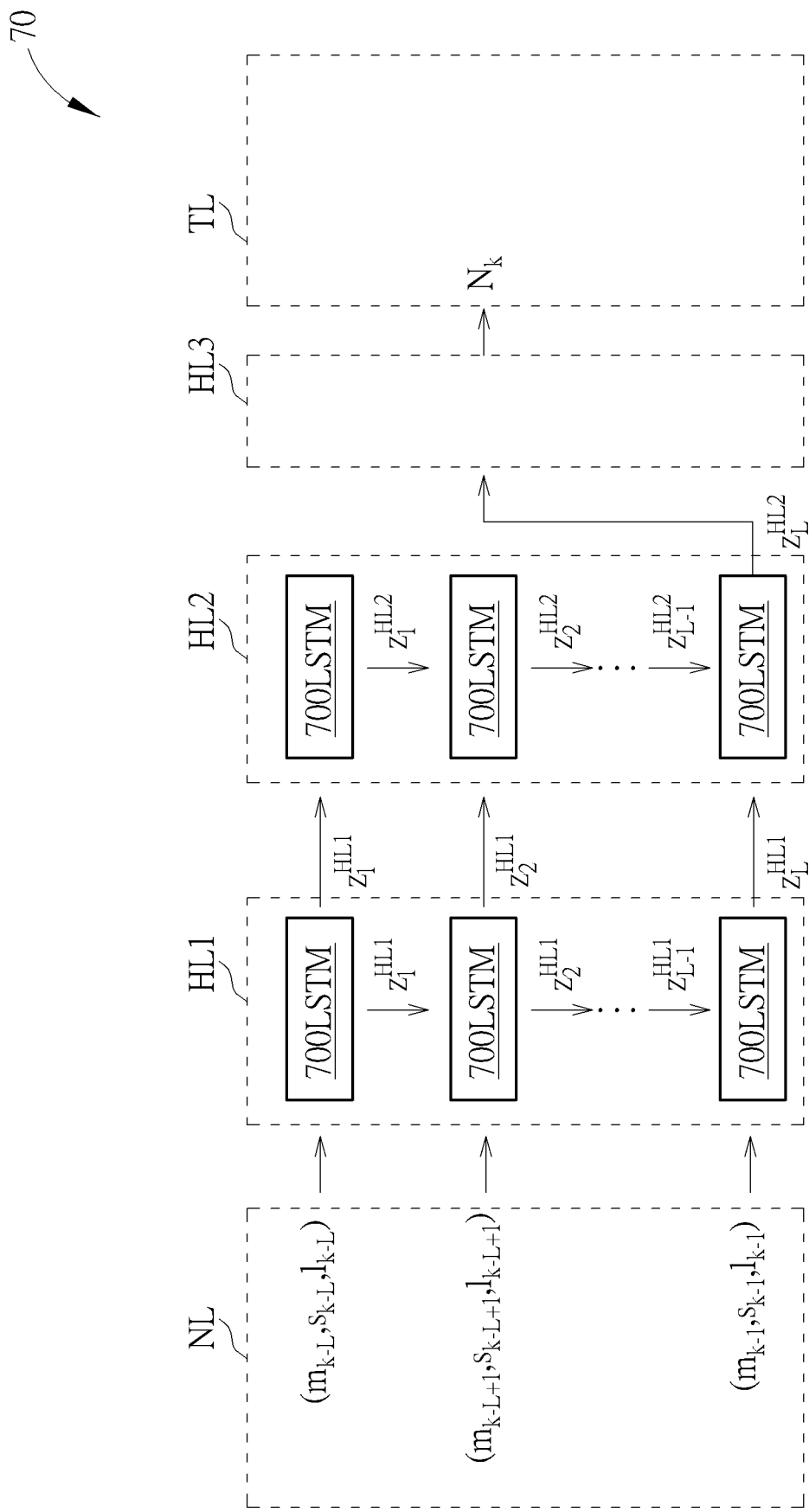
FIG. 7 is a schematic diagram of a neural network according to an embodiment of the present invention.

For example, FIG. 7 is a schematic diagram of a neural network 70 according to an embodiment of the present invention. The neural network 70 may include an input layer NL, a plurality of hidden layers (e.g., HL1, HL2, HL3), and an output layer TL. The hidden layer HL1 or HL2, which may be a LSTM layer, may include a plurality of neural units 700LSTM to offer output vectors $z_1^{HL1}$-$z_L^{HL1}$, $z_1^{HL2}$-$z_L^{HL2}$ respectively. The output vector $z_L^{HL2}$ may satisfy $z_L^{HL2}=f_\lambda(M_{k-1}, S_{k-1}, L_{k-1})$. The hidden layer HL3 may be a fully-connected layer or a neural network layer involving linear operations. As shown in FIG. 7, total node numbers $m_{k-L}$ to $m_{k-1}$ of the cluster 10 at (previous) time instants k–L to k–1 in the past (i.e., before the time instant k), total PDU session numbers $s_{k-L}$ to $s_{k-1}$ (each referred to as the total number of PDU sessions) of the cluster 10 at the (previous) time instants k–L to k–1, and total throughput $l_{k-L}$ to $l_{k-1}$ of the cluster 10 at the (previous) time instants k–L to k–1 are used to predict the node number $N_k$ at the (future) time instant k. That is to say, the node number $N_k$ at the (future) time instant k may be a function of a time series $M_{k-1}$ of the total node numbers (i.e., the total node number $m_{k-L}$ to $m_{k-1}$ of the cluster 10 at the (previous) time instants k–L to k–1), a time series $S_{k-1}$ of the total PDU session numbers (i.e., the total PDU session numbers $s_{k-L}$ to $s_{k-1}$ of the cluster 10 at the (previous) time instants k–L to k–1), or a time series $L_{k-1}$ of the total throughput (i.e., the total throughput $l_{k-L}$ to $l_{k-1}$ of the cluster 10 at the (previous) time instants k–L to k–1). For example, it may satisfy $N_k=P_w(M_{k-1}, S_{k-1}, L_{k-1})$, where $P_w( )$ denotes a function, and the time series $M_{k-1}$, $S_{k-1}$, and $L_{k-1}$ may satisfy $M_{k-1}=(m_{k-L}, \ldots, m_{k-1})$, $S_{k-1}=(s_{k-L}, \ldots, s_{k-1})$, and $L_{k-1}=(l_{k-L}, \ldots, l_{k-1})$ respectively.

In an embodiment, during the training stage, the label(s) or ground truth(s) of training data (e.g., the node number $N_k$) is/are obtained by manual calculation/adjustment/test (e.g., trial and error) to achieve lower delay, jitter, or packet loss.

In step S604 (e.g., corresponding to step S406 or S504), the configuration unit 380SMO may use an algorithm to select at least one node (e.g., 1N5) for deploying a CN according to the transmission time interval(s) (TTI) for one node (e.g., 1N1) to communicate with other node(s) (e.g., 1N2-1Nn) or according to the relative distance(s) between one node (e.g., 1N1) and other node(s) (e.g., 1N2-1Nn). In an embodiment, network function(s) of a CN of the cluster 10 may be configured in the center of the network to enable shorter path or time for transmission between the CN and each RAN.

In an embodiment, the configuration unit 380SMO may respectively measure the transmission time interval between each node (e.g., 1N1) and another node (e.g., 1N2) of the cluster 10, and get $C_2^n$ (different) transmission time intervals for n nodes (e.g., 1N1-1Nn). Then, the configuration unit 380SMO may calculate the average of the transmission time intervals (referred to as an average transmission time interval) of each node (e.g., 1N1) with respect to the other node(s) (e.g., 1N2-1Nn) of the cluster 10 according to the $C_2^n$ transmission time intervals, and obtain n (different) average transmission time intervals for n nodes (e.g., 1N1-1Nn). Then, the configuration unit 380SMO may select smaller average transmission time interval(s) (referred to as first average transmission time interval(s)) from the n average transmission time intervals. For example, the configuration unit 380SMO may select $N_k$ smaller/minimum average transmission time intervals from the n average transmission time intervals so as to choose $N_k$ (different) nodes (e.g., 1N5), which are corresponding to the $N_k$ average transmission time intervals, from all the nodes (e.g., 1N1-1Nn) of the cluster 10 for deploying of network function(s) of the CN. The node number $N_k$ may be inferred/predicted in step S602. In an embodiment, an average transmission time interval avg (TTI), of the i-th node (e.g., 1N1) of the cluster 10 may satisfy $$avg(TTI)_i = \frac{\sum_{i \neq j} \sum_{t=0}^{U} TTI_{ij}}{U \times (n-1)}.$$

The average transmission time interval(s) avg(TTI), may be used, for example, to select $N_k$ (different) node(s) with smaller shorter average transmission time interval(s) from the cluster 10 to deploy network function(s) of the CN to the $N_k$ node(s), where n is the total (node) number of nodes (e.g., 1N1-1Nn) of the cluster 10, U is the number of measurements of the transmission time intervals among the n nodes of the cluster 10 (e.g., U=10 means that the transmission time interval $TTI_{ij}$ between the i-th node and the j-th node is measured 10 times), i is a positive integer from 1 to n, and j is a positive integer from 1 to n.

In an embodiment, if the total node number of nodes (e.g., 1N1-1Nn) in the cluster 10 (at the time instant k) is less than or equal to the node number $N_k$ (at the time instant k), network function(s) of a CN may be distributed among (each/all of) the nodes (e.g., 1N1-1Nn) for cooperative operation. Therefore, step S604 may be optionally omitted. On the other hand, if the total node number of nodes (e.g., 1N1-1Nn) in the cluster 10 (at the time instant k) is greater than the node number $N_k$ (at the time instant k), the $N_k$ node(s) selected from the cluster 10 in step S604 are configured to deploy the network function(s) of the CN, and any of the selected $N_k$ node(s) (e.g., 1N1) has a relatively small average transmission time interval to the other node(s) (e.g., 1N2-1Nn).

Figure 8:
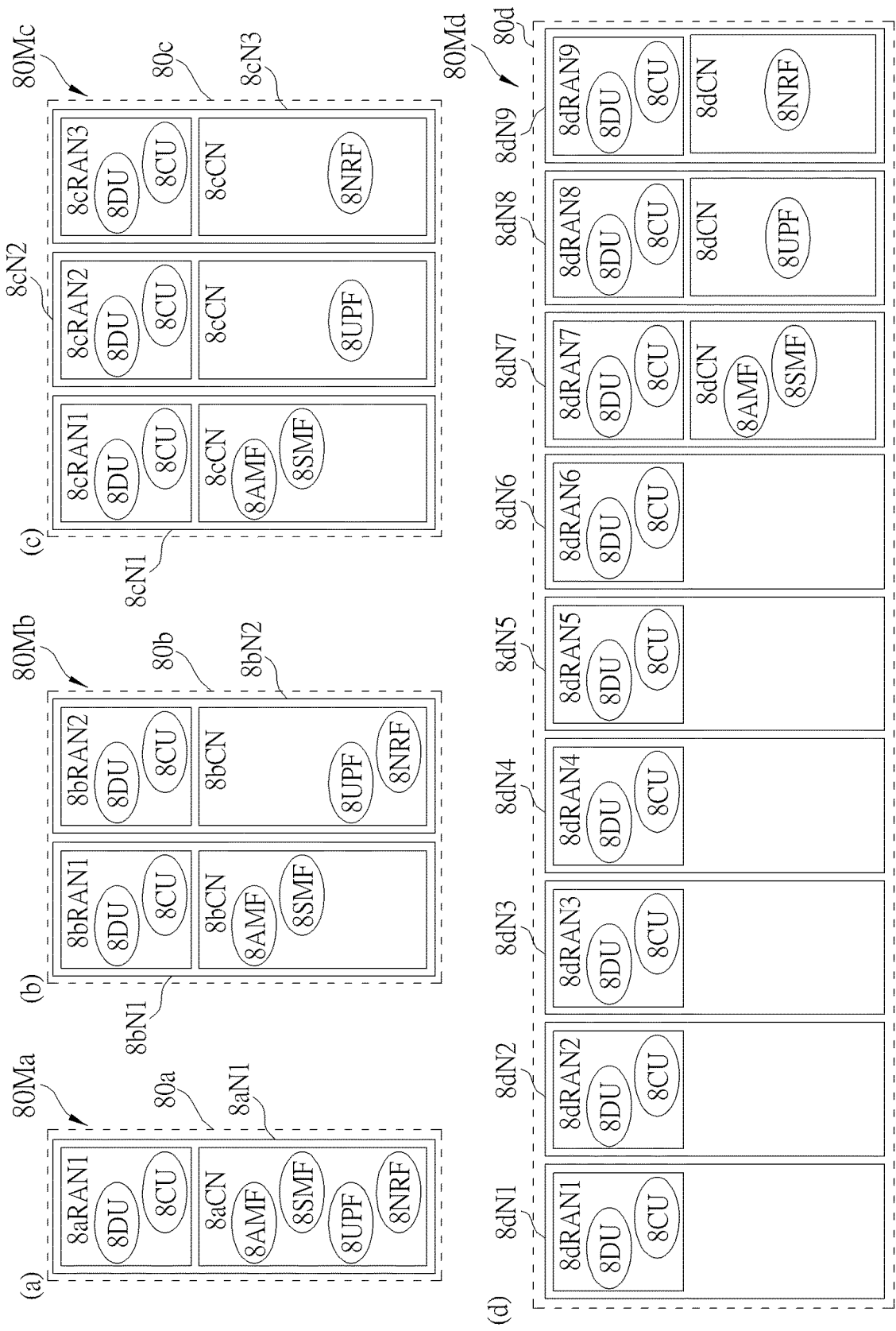
FIG. 8 is a schematic diagram of configuration methods according to an embodiment of the present invention.

For example, FIG. 8 is a schematic diagram of configuration methods 80Ma-80Md according to an embodiment of the present invention. In FIG. 8, (a) illustrates a cluster 80a including a node 8aN1; (b) illustrates a cluster 80b including nodes 8bN1 and 8bN2; (c) illustrates a cluster 80c including nodes 8cN1-8cN3; (d) illustrates a cluster 80d including nodes 8dN1-8dN9. In FIG. 8, the node number $N_k$ may be set to three. As shown in (a) to (c) in FIG. 8, when the total node number (i.e., 1, 2, and 3 respectively) of a cluster (e.g., 80a-80c) is less than or equal to 3, network functions (e.g., an AMF 8AMF, an SMF 8SMF, a UPF 8UPF, or an NRF 8NRF) of a CN (e.g., 8aCN-8cCN) may be directly deployed on all the nodes (e.g., 8aN1, 8bN1, 8bN2, or 8cN1-8cN3) of the cluster. One certain node of the cluster may serve as a master node. As shown in (d) of FIG. 8, when the total node number (i.e., 9) of nodes (i.e., 8dN1-8dN9) in the cluster 80d exceeds three, the configuration unit 380SMO may select three nodes from the cluster 80d to deploy network function(s) (e.g., the AMF 8AMF, the SMF 8SMF, the UPF 8UPF, or the NRF 8NRF) of a CN (e.g., 8dCN). Moreover, the average transmission time interval between any of the selected three nodes (e.g., 8dN7, 8dN8, or 8dN9) and the other nodes (e.g., 8dN1-8dN9) in the cluster 80d (e.g., the average transmission time interval from the selected node 8dN7 to the nodes 8dN1-8dN6, 8dN8-8dN9, the average transmission time interval from the selected node 8dN8 to the nodes 8dN1-8dN7, 8dN9, or the average transmission time interval from the selected node 8dN9 to the nodes 8dN1-8dN8) is shorter than the average transmission time interval between any of the six unselected nodes (e.g., 8dN1, . . . or 8dN6) and the other nodes (e.g., 8dN1-8dN9) in the cluster 80d (e.g., the average transmission time interval from the unselected node 8dN1 to the nodes 8dN2-8dN9, . . . the average transmission time interval from the unselected node 8dN6 to the nodes 8dN1-8dN5, 8dN7-8dN9). As shown in (d) of FIG. 8, when the total node number (i.e., 9) of nodes (i.e., 8dN1-8dN9) in the cluster 80*d* is greater than three, three or more nodes may be selected from the cluster 80*d* to serve as master node(s). In another embodiment, the only master node may be external and disposed in, for example, the configuration unit 380SMO.

In an embodiment, the transmission time interval between any two nodes (e.g., the transmission time interval $TTI_{ij}$ between the i-th node and the j-th node) may be determined using a network "ping" method (e.g., the transmission time interval $TTI_{ij}$ equal/proportional to the time difference between a time instant to send a PING request from the i-th node and another time instant to receive a PING reply by the i-th node), the ARP, the ICMP, or other network protocols. In an embodiment, node(s) (e.g., 1N1-1Nn) of the cluster do not move after being disposed, set up, or plugin; alternatively, node(s) (e.g., 1N1-1Nn) of the cluster remain stationary when (all) the transmission time intervals between nodes are being measured (e.g., step S604).

The configuration unit 380SMO not only deploys network function(s) of a CN in steps S602-S604 but also deploy network function(s) of RAN(s). In an embodiment, part of the nodes of a cluster (e.g., the node 8*d*N9 of the cluster 80*d*) may be configured to perform/run network function(s) of a CN (e.g., 8*d*CN), while another part of the nodes of the cluster (e.g., the node 8*d*N1 of the cluster 80*d*) cannot be used to run network function(s) of the CN (e.g., 8*d*CN). In an embodiment, each node of a cluster (e.g., the nodes 8*d*N1-8*d*N9 of the cluster 80*d*) may be configured to run network function(s) of RAN(s) (e.g., 8*d*RAN1-8*d*RAN9). Alternatively, in an embodiment, part of the nodes in a cluster may be configured to run network function(s) of RAN(s), while another part of the nodes of the cluster cannot be used to run network function(s) of the RAN(s). In an embodiment, one node of a cluster (e.g., the node 8*d*N1 of the cluster 80*d*) may be configured to run network function(s) of only one of a RAN (e.g., 8*d*RAN1) and a CN (e.g., either network function(s) of a RAN or network function(s) of a CN). In an embodiment, one node of a cluster (e.g., the node 8*d*N9 of the cluster 80*d*) may be configured to perform only part of the network functions (e.g., a DU 8DU or a CU 8CU) of a RAN (e.g., 8*d*RAN9) or only part of the network functions (e.g., the NRF 8NRF) of a CN (e.g., 8*d*CN). In an embodiment, part of network function(s) (for example, the AMF 8AMF and the SMF 8SMF, or, for example, the DU 8DU and the CU 8CU) tend to be deployed on the same node (e.g., 8*d*N7), while part of network function(s) (e.g., the UPF 8UPF) may be deployed on one single node alone (e.g., 8*d*N8) or more nodes (e.g., the node 8*d*N8 and/or other node(s)). For example, as the total PDU session number (e.g., $s_{k-L}$ to $s_{k-1}$) or the total throughput (e.g., $l_{k-L}$ to $l_{k-1}$) increases, the node number (referred to as the number of nodes) corresponding to the UPF 8UPF may increase.

In terms of dynamic RAN function configuration, since network function(s) of RAN(s) (e.g., 8*d*RAN1-8*d*RAN9) are scattered/distributed in a cluster (e.g., 80*d*), resource allocation may be performed for the DU (e.g., 8DU) or the CU (e.g., 8CU) of the RAN (e.g., 8*d*RAN1) of each node (e.g., 8*d*N1).

In an embodiment, for the configuration of the DU or the CU of the RAN of a node (e.g., 8*d*N1), the configuration unit 380SMO may first provide an initial setting. When congestion occurs in the RAN (e.g., insufficient resources in the DU or the CU resulting in the inability to process packet(s) in time or a decrease in user-perceived IP throughput), resource re-allocation/re-configuration for the DU and the CU may start to achieve dynamic RAN function configuration.

In an embodiment, since the DU and the CU of a RAN may run/operate in a way/form of containerized microservices, the VPA mechanism may be used to dynamically allocate/increase/decrease compute resources (e.g., central processing unit(s) (CPU), processor(s), memory/memories, accelerator(s), or other hardware resource(s)) of the DU and the CU of the RAN of a node (e.g., 8*d*N1) when the resources of the DU or the CU are insufficient, thereby realizing dynamic RAN function configuration. In an embodiment, the resource usage of CPU(s) or memory/memories may be estimated according to user-perceived IP throughput.

Figure 9:
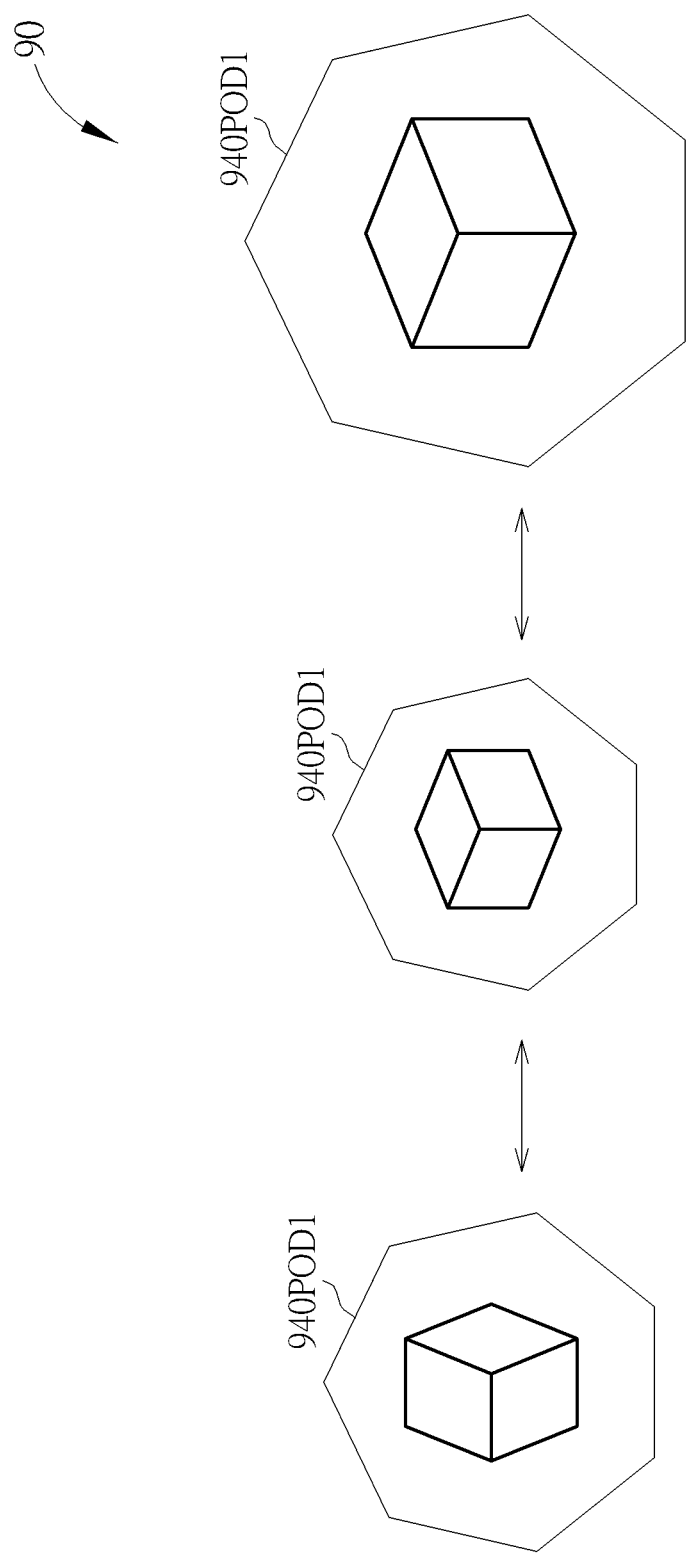
FIG. 9 is a schematic diagram of a configuration method according to an embodiment of the present invention.

FIG. 9 is a schematic diagram of a configuration method 90 according to an embodiment of the present invention. In an embodiment, the configuration of CPU(s) and memory/memories of a pod (e.g., 940POD1) may be increased/decreased according to previous/historical resource usage so as to efficiently and automatically allocate the resources of a cluster (e.g., 10) and scale capacity. For example, as shown in FIG. 9, the resource requirements of the pod 940POD1 may be adjusted from 2 cores or virtual cores of CPU and 2 gigabytes (GB) of memory to 4 cores or virtual cores of CPU and 6 GB of memory to improve resource shortages. On the other hand, the resource requirements of the pod 940POD1 may be reduced from 2 (virtual) cores of CPU and 4 GB of memory to 2 (virtual) cores of CPU and 2 GB of memory to shrink the pod 940POD1 and reduce excessive resource demands of the pod 940POD1. The pod 940POD1 may be used to implement the pod 240POD1, . . . or 240PODw.

To sum up, a node (which may be disposed in one suitcase/luggage) may deploy a network in an application environment, and nodes (which may be disposed in a plurality of suitcases/luggage) may form/constitute a cluster to deploy a network in another application environment of a larger area. In other words, the coverage or processing capacity of a network may be expanded or reduced by increasing or decreasing the total number of nodes in the cluster so as to achieve the effect of a plug-and-expand network or a unplug-and-shrink network. Moreover, with the functional architecture of the present invention, the dependence on data center(s) or telecommunications/equipment room(s) may be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A configuration method, for a configuration unit coupled to a cluster, comprising:
   calculating a first node number at a first time instant by the configuration unit; and
   selecting at least one first node corresponding to the first node number from at least one node of the cluster, wherein the at least one first node is configured to run a plurality of network functions of a core network in a mobile network respectively;
   wherein a vertical pod autoscaler mechanism is used to dynamically increase or decrease resource of at least one network function of a radio access network run by one of the at least one node of the cluster.

2. The configuration method of claim 1, wherein the first node number at the first time instant is a function of a plurality of total node numbers of the cluster at a plurality of previous time instants, a plurality of total protocol data unit session numbers of the cluster at the plurality of previous time instants, or a plurality of total throughput of the cluster at the plurality of previous time instants, and the plurality of previous time instants are earlier than or precede the first time instant.

3. The configuration method of claim 1, wherein the step of selecting the at least one first node corresponding to the first node number from the at least one node of the cluster comprises:
measuring a transmission time interval between one of the at least one node and another of the at least one node respectively to obtain at least one transmission time interval for the one of the at least one node;
calculating an average transmission time interval of one of the at least one node with respect to others of the at least one node of the cluster according to the at least one transmission time interval respectively to obtain at least one average transmission time interval for the at least one node;
selecting at least one first average transmission time interval that is smaller than others of the at least one average transmission time interval from the at least one average transmission time interval; and
selecting the at least one first node corresponding to the at least one first average transmission time interval from the at least one node of the cluster.

4. The configuration method of claim 1, wherein the step of selecting the at least one first node corresponding to the first node number from the at least one node of the cluster comprises:
selecting the at least one node of the cluster as the at least one first node according to a total node number of the cluster being less than or equal to the first node number; or
selecting the at least one first node of the first node number from the at least one node of the cluster according to the total node number of the cluster being greater than the first node number.

5. The configuration method of claim 1, wherein the first node number at the first time instant is calculated after the configuration unit responds to a second node with registration information or after the second node is added to the cluster.

6. The configuration method of claim 1, wherein the first node number at the first time instant is calculated after the configuration unit fails to detect a third node of the cluster or after the third node is removed from the cluster.

7. The configuration method of claim 1, further comprising:
deploying or migrating the plurality of network functions of the core network to the at least one first node respectively.

8. The configuration method of claim 1, wherein one of the at least one node of the cluster is configured to run at least one network function of a radio access network or at least one of the plurality of network functions of the core network.

9. The configuration method of claim 1, further comprising:
performing resource allocation for at least one network function of a radio access network running on one of the at least one node of the cluster.

10. The configuration method of claim 1, wherein an algorithm is used to dynamically deploy the plurality of network functions of the core network to the at least one first node, and coverage of a network corresponding to the cluster is dynamically expanded or reduced by increasing or decreasing a total node number of the cluster.

11. A configuration unit, coupled to a cluster, comprising:
a processing circuit, configured to execute a program code; and
a storage circuit, coupled to the processing circuit and configured to store the program code, wherein the program code instructs the processing circuit to perform following steps:
calculating a first node number at a first time instant; and
selecting at least one first node corresponding to the first node number from at least one node of the cluster, wherein the at least one first node is configured to run a plurality of network functions of a core network in a mobile network respectively;
wherein a vertical pod autoscaler mechanism is used to dynamically increase or decrease resource of at least one network function of a radio access network run by one of the at least one node of the cluster.

12. The configuration unit of claim 11, wherein the first node number at the first time instant is a function of a plurality of total node numbers of the cluster at a plurality of previous time instants, a plurality of total protocol data unit session numbers of the cluster at the plurality of previous time instants, or a plurality of total throughput of the cluster at the plurality of previous time instants, and the plurality of previous time instants are earlier than or precede the first time instant.

13. The configuration unit of claim 11, wherein the step of selecting the at least one first node corresponding to the first node number from the at least one node of the cluster comprises:
measuring a transmission time interval between one of the at least one node and another of the at least one node respectively to obtain at least one transmission time interval for the one of the at least one node;
calculating an average transmission time interval of one of the at least one node with respect to others of the at least one node of the cluster according to the at least one transmission time interval respectively to obtain at least one average transmission time interval for the at least one node;
selecting at least one first average transmission time interval that is smaller than others of the at least one average transmission time interval from the at least one average transmission time interval; and
selecting the at least one first node corresponding to the at least one first average transmission time interval from the at least one node of the cluster.

14. The configuration unit of claim 11, wherein the step of selecting the at least one first node corresponding to the first node number from the at least one node of the cluster comprises:
selecting the at least one node of the cluster as the at least one first node according to a total node number of the cluster being less than or equal to the first node number; or
selecting the at least one first node of the first node number from the at least one node of the cluster according to the total node number of the cluster being greater than the first node number.

15. The configuration unit of claim 11, wherein the first node number at the first time instant is calculated after the configuration unit responds to a second node with registration information or after the second node is added to the cluster.

16. The configuration unit of claim 11, wherein the first node number at the first time instant is calculated after the configuration unit fails to detect a third node of the cluster or after the third node is removed from the cluster.

17. The configuration unit of claim 11, wherein the program code instructs the processing circuit to further perform following step:
 deploying or migrating the plurality of network functions of the core network to the at least one first node respectively.

18. The configuration unit of claim 11, wherein one of the at least one node of the cluster is configured to run at least one network function of a radio access network or at least one of the plurality of network functions of the core network.

19. The configuration unit of claim 11, wherein the program code instructs the processing circuit to further perform following step:
 performing resource allocation for at least one network function of a radio access network running on one of the at least one node of the cluster.

20. The configuration unit of claim 11, wherein an algorithm is used to dynamically deploy the plurality of network functions of the core network to the at least one first node, and coverage of a network corresponding to the cluster is dynamically expanded or reduced by increasing or decreasing a total node number of the cluster.

* * * * *